US012641599B2

(12) United States Patent
Raghavan et al.

(10) Patent No.: US 12,641,599 B2
(45) Date of Patent: *May 26, 2026

(54) UNIFIED TCI FRAMEWORK

(71) Applicant: Apple Inc., Cupertino, CA (US)

(72) Inventors: Manasa Raghavan, Sunnyvale, CA (US); Dawei Zhang, Saratoga, CA (US); Huaning Niu, San Jose, CA (US); Jie Cui, San Jose, CA (US); Qiming Li, Beijing (CN); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,454

(22) Filed: Sep. 25, 2023

(65) Prior Publication Data

US 2024/0015737 A1      Jan. 11, 2024

Related U.S. Application Data

(63) Continuation of application No. 17/906,223, filed as application No. PCT/CN2021/120395 on Sep. 24, 2021.

(51) Int. Cl.
*H04W 72/23* (2023.01)
*H04L 5/00* (2006.01)
(Continued)

(52) U.S. Cl.
CPC ....... *H04W 72/1268* (2013.01); *H04L 5/0051* (2013.01); *H04W 16/28* (2013.01); *H04W 72/231* (2023.01)

(58) Field of Classification Search
CPC ............. H04W 72/1268; H04W 16/28; H04W 72/231; H04L 5/0051
See application file for complete search history.

(56) References Cited

U.S. PATENT DOCUMENTS

2021/0329517 A1   10/2021   Noh et al.
2022/0217705 A1*   7/2022   Zhou ...................... H04L 5/001
(Continued)

FOREIGN PATENT DOCUMENTS

CN         111901020      11/2020
KR         20200020567     2/2020
WO         2021/161544     8/2021

OTHER PUBLICATIONS

3GPP TSG-RAN WG4 Meeting #100e, R4-2113823, Discussion on multi-beam operation enhancements for R17 NR FeMIMO (Year: 2021).*
(Continued)

*Primary Examiner* — Faruk Hamza
*Assistant Examiner* — Aixa A Guadalupe Cruz
(74) *Attorney, Agent, or Firm* — Fay Kaplun & Marcin, LLP

(57) ABSTRACT

A user equipment (UE) is configured to receive a command for a transmission configuration indicator (TCI) state change for a joint TCI state including uplink (UL) and downlink (DL) signals, decode the joint ICI state command and performing measurements necessary to receive and transmit with the target TCI state, the measurements including a pathloss (PL) measurement for an UL channel and switch to receive the DL signals and transmit the UL signals with the target TCI state no later than a time duration for a switching delay.

13 Claims, 4 Drawing Sheets

Method 400

Start

UE receives TCI state switch command — 405

UE decodes TCI state switch command and performs measurements necessary to receive/transmit with target TCI state — 410

UE switches from current TCI state to target TCI state no later than switching delay — 415

End

(51) Int. Cl.

| | |
|---|---|
| *H04W 16/28* | (2009.01) |
| *H04W 72/10* | (2009.01) |
| *H04W 72/1268* | (2023.01) |
| *H04W 72/231* | (2023.01) |

(56) References Cited

U.S. PATENT DOCUMENTS

| | | | | |
|---|---|---|---|---|
| 2022/0361160 A1* | 11/2022 | Bai | ..................... | H04W 72/046 |
| 2023/0028861 A1 | 1/2023 | Yao et al. | | |
| 2023/0072323 A1 | 3/2023 | Matsumura et al. | | |
| 2024/0014935 A1* | 1/2024 | Yuan | ................. | H04B 7/06952 |
| 2024/0297771 A1* | 9/2024 | Li | ........................ | H04B 17/328 |

OTHER PUBLICATIONS

3GPP TSG-RAN WG1 Meeting #106e, R1-2106541, Enhancements on Multi-Beam Operation (Year: 2021).*
Hua Zhou, Unified Beam Management, Offino (Year: 2021).*
Apple Inc., "Discussion on requirements for UL spatial relation info switch", 3GPP TSG-RAN WG4 Meeting # 95-e, R4-2006204, May 16, 2020, 4 sheets.

* cited by examiner

Network Arrangement
100

Method 400

UNIFIED TCI FRAMEWORK

BACKGROUND INFORMATION

A transmission configuration indicator (TCI) state contains parameters for configuring a quasi co-location (QCL) relationship between one or more reference signals (RS) and corresponding antenna ports. For example, the demodulation reference signal (DMRS) ports of the physical downlink shared channel (PDSCH), the DMRS port of the physical downlink control channel (PDCCH), or the channel state indicator reference signal (CSI-RS) port(s) of a CSI-RS resource set may be associated with a QCL relationship. Two quasi co-located signals experience very similar channel conditions, such that determining the channel properties of one of the signals will substantially aid the channel property determination of the other signal. A TCI state change may be implemented by a network and indicated to a user equipment (UE) in the network. The US is expected to complete the switch from the former (current) TCI state to the new (target) TCI state within a specified delay time.

SUMMARY

Some exemplary embodiments are related to a processor of a user equipment (US) configured to perform operations. The operations include receiving a command for a transmission configuration indicator (TCI) state change for a joint TCI state including uplink (UL) and downlink (DL) signals, decoding the joint TCI state command and performing measurements necessary to receive and transmit with the target TCI state, the measurements including a pathloss (PL) measurement for an UL channel and switching to receive the DL signals and transmit the UL signals with the target TCI state no later than a time duration for a switching delay.

Other exemplary embodiments are related to a user equipment (UE) having a transceiver configured to communicate with a network and a processor communicatively coupled to the transceiver and configured to perform operations. The operations include receiving a command for a transmission configuration indicator (TCI) state change for a joint TCI state including uplink (UL) and downlink (DL) signals, decoding the joint TCI state command and performing measurements necessary to receive and transmit with the target TCI state, the measurements including a pathloss (PL) measurement for an UL channel and switching to receive the DL signals and transmit the UL signals with the target TCI state no later than a time duration for a switching delay.

Still further exemplary embodiments are related to a processor of a user equipment (UE) configured to perform operations. The operations include receiving a command for a transmission configuration indicator (TCI) state change for a separate uplink (UL) TCI state including UL signals and not including downlink (DL) signals, decoding the separate UL TCI state command and performing measurements necessary to receive and transmit with the target TCI state, the measurements including a pathloss (PL) measurement for an UL channel and switching to transmit the UL signals with the target TCI state no later than a time duration for a switching delay.

Additional exemplary embodiments are related to a user equipment (UE) having a transceiver configured to communicate with a network and a processor communicatively coupled to the transceiver and configured to perform operations. The operations include receiving a command for a transmission configuration indicator (TCI) state change for a separate uplink (UL) TCI state including UL signals and not including downlink (DL) signals, decoding the separate UL TCI state command and performing measurements necessary to receive and transmit with the target TCI state, the measurements including a pathloss (PL) measurement for an UL channel and switching to transmit the UL signals with the target TCI state no later than a time duration for a switching delay.

DETAILED DESCRIPTION

Figure 1:
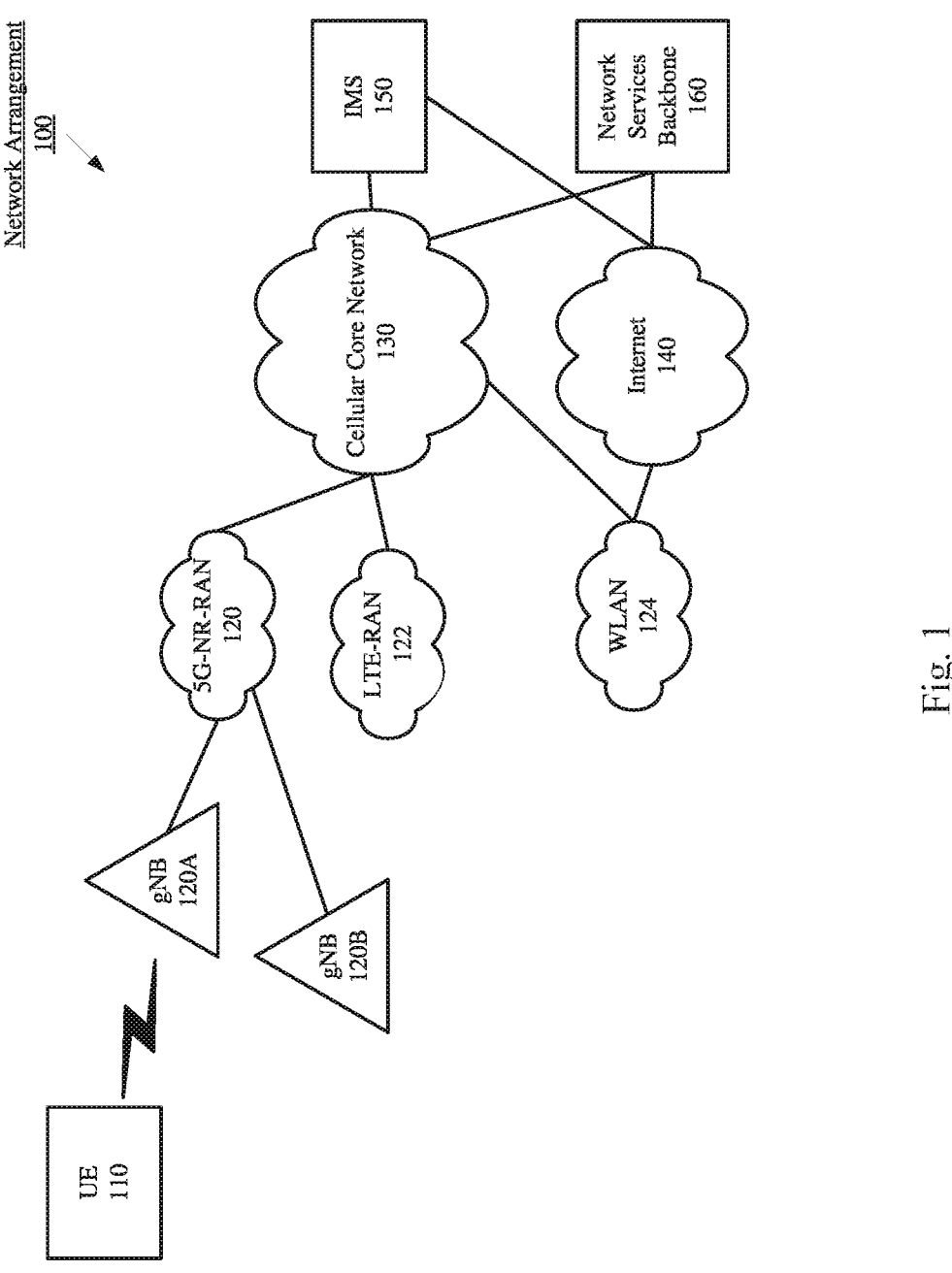
FIG. 1 shows a network arrangement according to various exemplary embodiments.

The exemplary embodiments may be further understood with reference to the following description and the related appended drawings, wherein like elements are provided with the same reference numerals. The exemplary embodiments describe configurations for a user equipment (UE) in a 5G New Radio (NR) network related to an allowable delay time for switching a transmission configuration indicator (TCI) state. The delay time may be specified differently for various scenarios based on different considerations related to the respective scenarios, to be described in detail below.

In some embodiments, a joint TCI state switch may be configured that includes an association of uplink (UL) and downlink (DL) reference signals (RS). In other embodiments, a separate UL TCI state switch is configured that includes an association of UL RS. In either of these scenarios, the TCI state switch from a current TCI state to a target TCI state may be indicated by a medium access control (MAC) control element (MAC-CE) and/or downlink control information (DCI). The delay time for the TCI state switch may be specified based on considerations such as a time duration for decoding the TCI state switch command, a time duration for beam refinement, a time duration for time and frequency tracking for the target TCI state, and a time duration for pathloss measurement, to be described in detail below.

The exemplary embodiments are described with regard to a UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a 5G New Radio (NR) network. However, reference to a 5G NR network is merely provided for illustrative purposes. The exemplary embodiments may be utilized with any network implementing a TCI state architecture similar to that described herein. Therefore, the 5G NR network as described herein may represent any type of network implementing similar TCI state functionalities as the 5G NR network.

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g., legacy cellular networks) and the UE 110 may also communicate with networks over a wired connection. With regard to the exemplary embodiments, the UE 110 may establish a connection with the 5G NR-RAN 120.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNBs 120A, 120B is merely for illustrative purposes. The exemplary embodiments may apply to any appropriate number of gNBs.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
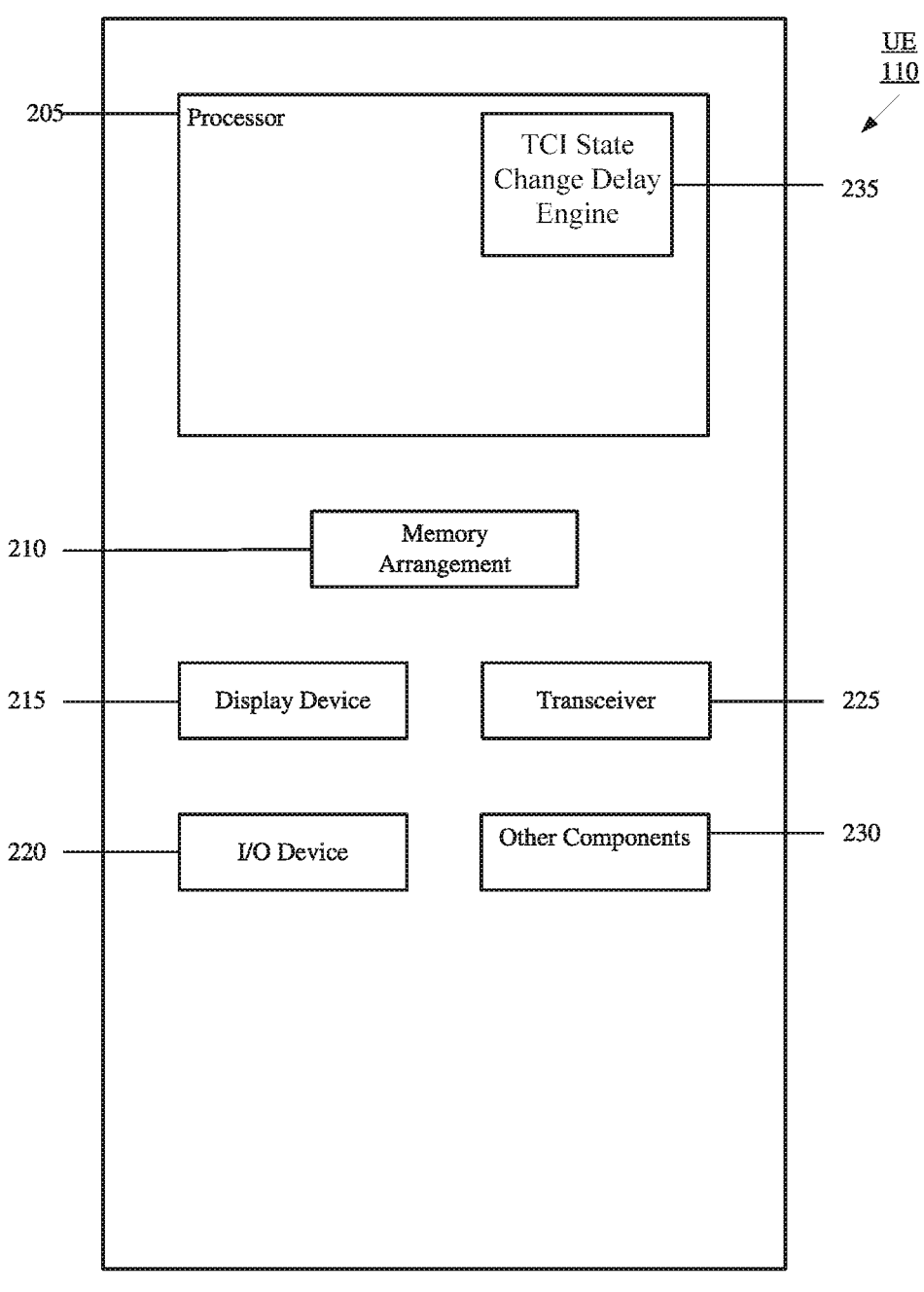
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a TCI state change delay engine 235. The TCI state change delay engine 235 may perform operations including determining a span of time for continuing to use an old TCI state after receiving a TCI state change indicator from the network. The UE 110 may make such a determination based on various considerations involved in the TCI state change, including, for example, whether the TCI state change is for a joint TCI state switch or for a separate UL TCI state switch and whether the TCI state change was indicated via a Medium. Access Control-Control Element (MAC-CE) or a Radio Resource Control (RRC) activation command that may have different command decoding times. The UE 110 may also consider whether additional time is needed for Tx beam refinement, T/F tracking or pathloss measurement. The specific implementations for these various scenarios will be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a. UE. The memory 210 may be a hardware component configured to store data related to operations performed by the UE 110.

The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
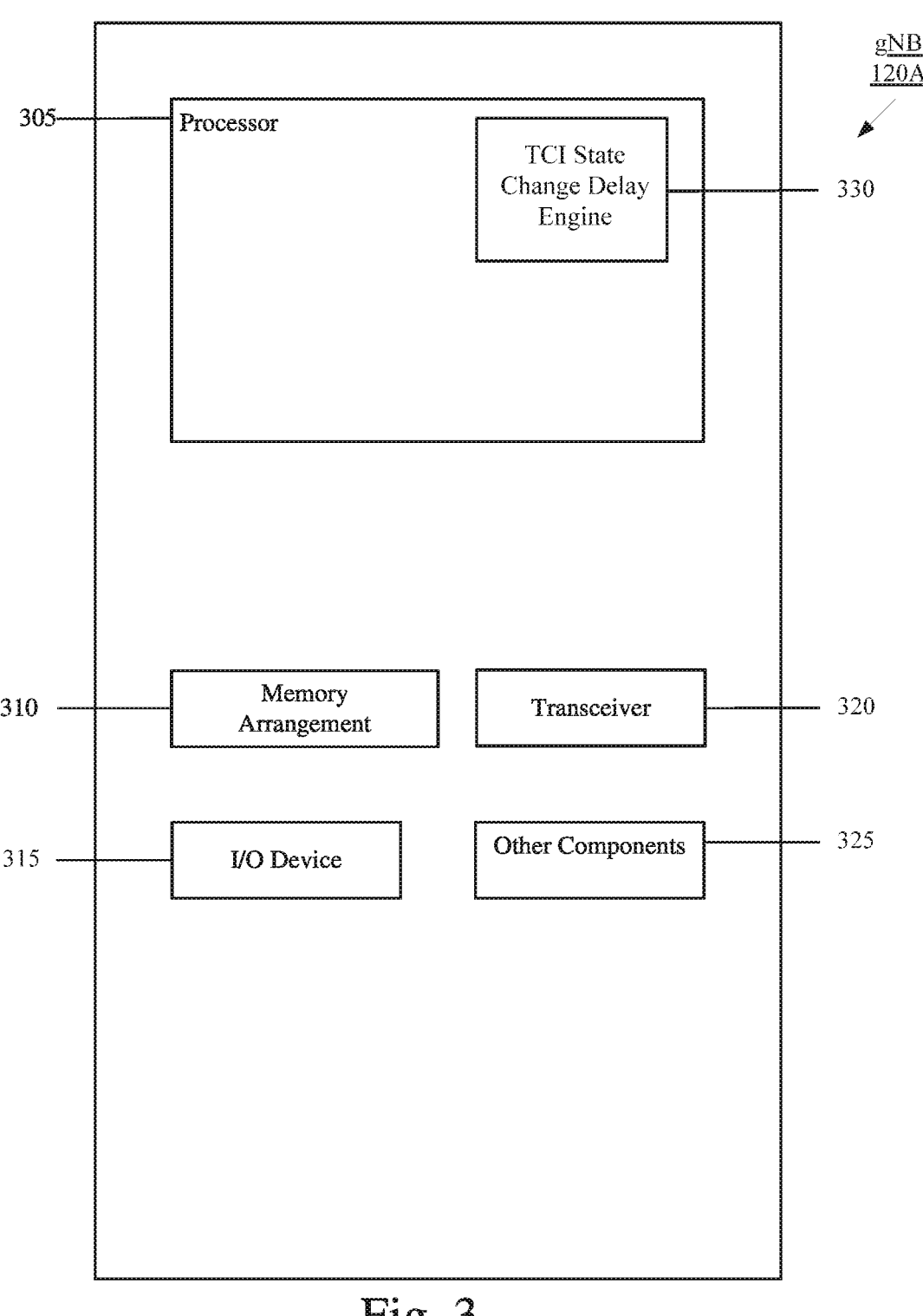
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a serving cell for the UE 110. The gNB 120A may represent any access node of the 5G NR network through which the UEs 110 may establish a connection and manage network operations. The gNB 120A illustrated in FIG. 3 may also represent the gNB 120B.

The gNB 120A may include a processor 305, a memory arrangement 310, an input/output (I/O) device 315, a transceiver 320, and other components 325. The other components 325 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a TCI state change delay engine 330. The TCI state change delay engine 235 may perform operations including indicating a TCI state change to the UE 110, for example a joint TCI state change or a separate UL joint TCI state change. The TCI state change delay engine 330 may further determine a span of time for the UE 110 to continue to use an old TCI state after receiving the TCI state change indicator. The gNB 120A may make such a determination based on various considerations involved in the TCI state change, including, for example, whether the TCI state change is for a joint TCI state switch or for a separate UL TCI state switch and whether the TCI state change was indicated via a Medium Access Control-Control Element (MAC-CE) or a Radio Resource Control (RRC) activation command that may have different command decoding times by the UE 110. The gNB 120A may also consider whether additional time is used by the UE 110 for Tx beam refinement, T/F tracking or pathloss measurement. The specific implementations for these various scenarios will be described in further detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100, e.g., if the gNB 120A serves as a PCell or an SCell to either or both of the UEs 110, 112. The transceiver 325 may operate on a variety of different frequencies or channels (e.g., set of consecutive frequencies). Therefore, the transceiver 325 may include one or more components (e.g., radios) to enable the data exchange with the various networks and UEs.

A transmission configuration indicator (TCI) state contains parameters for configuring a quasi co-location (QCL) relationship between one or more reference signals (RS) and corresponding antenna ports, e.g., the demodulation reference signal (DMRS) ports of the physical downlink shared channel (PDSCH), the DMRS port of the physical downlink control channel (PDCCH), or the channel state indicator reference signal (CSI-RS) port(s) of a CSI-RS resource set. Two quasi co-located signals experience very similar channel conditions, such that determining the channel properties of one of the signals will substantially aid the channel estimation of the other signal.

Existing QCL types defined in the Third Generation Partnership (3GPP) TS 38.214 include QCL-TypeA, QCL-TypeB, QCL-TypeC and QCL-TypeD. QCL-TypeA relates to Doppler shift, Doppler spread, average delay and delay spread. QCL-TypeB relates to Doppler shift and Doppler spread. The measurements for types A and B may be used to e.g., determine channel state information (CSI). QCL-TypeC relates to Doppler shift and average delay, and the measurements may be used to, for example, calculate reference signal received power (RSRP). Thus, QCL types A-C relate to timing and frequency error tracking information being shared across the ports corresponding to QCLed signals. QCL-TypeD relates to spatial Rx parameters and is used to support beamforming.

A TCI chain may be specified in the following manner. A reference signal is considered to be QCLed to another reference signal if it is in the same TCI chain as the other reference signal, provided that the number of reference signals in the chain is no more than 4. It may be considered that there is a single QCL type per TCI chain. With respect to DL-only TCI chains, a TCI chain comprises an SSB, and one or more CSI-RS resources, and the TCI state of each reference signal includes another reference signal in the same TCI chain. The DMRS of PDCCH or PDSCH is QCLed with the reference signal in its active TCI state and any other reference signal that is QCLed, based on above criteria, with the reference signal in the active TCI state.

A TCI chain may be configured to include UL components, including ports for UL RS, e.g., SRS, and/or UL channels, e.g., RACH, PUCCH, and PUSCH. A TCI chain may be configured with UL components only or in a mixed TCI chain also including DL components. A UE can use the Rx beam (QCL type D) from one component in a. QCL type D TCI chain to another component in the same QCL type D TCI chain for reception/transmission. The UE may also use the T/F tracking information (QCL type A/B/C) from one component in a QCL type A/B/C TCI chain to another component in the same QCL type A/B/C TCI chain for reception/transmission.

A UE may be configured with a list of up to M TCI state configurations within the higher layer parameters, e.g., M=8, which may be transmitted to the UE from the network in a medium access layer (MAC) control element (CE), a DCI message, or a radio resource control (RRC) activation command.

A UE configured with one or more TCI state configurations on a serving cell shall complete the switch of the active TCI state within a delay defined in, for example, 3GPP TS 38.133 section 8.10. The target TCI state is considered "known" by the UE if a set of conditions are met within a period spanning from a last transmission of the RS resource used for the Layer 1 Received Signal Reference Power (L1-RSRP) measurement reporting for the target TCI state to the completion of the active TCI state switch. For example, if the UE has measured the target TCI state or any TCI state in its QCL chain within some time duration prior to receiving the TCI state switch command. Otherwise, the TCI state may be considered "unknown."

In one example, for a MAC-CE based TCI state switch, the delay for a DL-only TCI state is defined in 3GPP TS 38.133 section 8.10.3 in the following manner. If the target TCI state is known, upon receiving the PDSCH carrying a MAC-CE activation command in slot n, the UE shall be able to receive the PDCCH with the target TCI state of the serving cell on which the TCI state switch occurs no later than in slot $n+T_{HARQ}+(3 \text{ ms}+TO_k*(T_{first-SSB}+T_{SSB-proc}))/NR$ slot length. The UE shall be able to receive the PDCCH with the old TCI state until slot $n+T_{HARQ}+(3 \text{ ms}+TO_k*(T_{first-SSB}))/NR$ slot length.

$T_{HARQ}$ represents the timing between the DL data transmission and corresponding acknowledgement, as specified in 3GPP TS 38.213. $T_{first\text{-}SSB}$ represents the timing between the MAC CE command being decoded by the UE to the first SSE transmission after, where the SSB shall be the QCL-TypeA or QCL-TypeC for the target TCI state. $T_{SSB\text{-}proc}=2$ ms. $TO_k=1$ if the target TCI state is not in the active TCI state list for the PDSCH, and $TO_k=0$ if the target TCI state is in the active TCI state list for the PDSCH.

If the target TCI state is unknown, upon receiving the PDSCH carrying a MAC-CE activation command in slot n, the UE shall be able to receive the PDCCH with the target TCI state of the serving cell on which the TCI state switch occurs no later than in slot $n+T_{HARQ}+(3$ ms$+T_{L1\text{-}RSRP}+TO_{uk}*(T_{first\text{-}SSB}+T_{SSB\text{-}proc}))$/NR slot length. The UE shall be able to receive the PDCCH with the old TCI state until slot $n+T_{HARQ}+(3$ ms$+T_{L1\text{-}RSRP}+TO_{uk}*(T_{first\text{-}SSB}))$/NR slot length. $T_{L1\text{-}RSRP}$ represents the time for an L1-RSRP measurement for Rx beam refinement and is defined as $T_{L1\text{-}RSPR\_Measurement\_Period\_SSB}$ for an SSB as specified in clause 9.5.4.1 or $T_{L1\text{-}RSRP\_Measurement\_Period\_CSI\text{-}RS}$ for CSI-RS as specified in clause 9.5.4.2, subject to various other considerations as defined in 3GPP TS 38.133 section 8.10.3. $TO_{uk}=1$ for a CSI-RS based L1-RSRP measurement, and $TO_{uk}=0$ for an SSB based L1-RSRP measurement when the TCI state switching involves QCL-TypeD. $TO_{uk}=1$ when the TCI state switching involves other QCL types.

To achieve a unified TCI framework, TCI state switching delay requirements must be specified for a joint TCI state switch and for a separate UL TCI state switch. The joint TCI state refers to a TCI chain including UL and DL signals, and a separate UL TCI state refers to a TCI chain including only UL signals (although the source RS may be a DL signal). Additionally, the requirements for a pathloss reference signal (PL-RS) update under the unified TCI framework must be specified. In the following, the term "source RS" may refer to an RS that is measured by the UE so that the channel properties for the channel carrying the RS can be determined, whereas the term "target RS" may refer to an RS that is associated with the source RS directly or in a TCI chain with the source RS.

According to some exemplary embodiments, the TCI state switching delay time is determined for a joint TCI state switch including DL and UL signals. For the joint TCI state including UL and DL signals, the source RS shall be a DL-RS. For example, the source RS may be either an SSE or a CSI-RS. The joint TCI state switch can be indicated by MAC CE and/or DCI. For example, the TCI state switch may be a MAC-CE-based joint TCI state switch, a DCI-based joint TCI state switch, or a MAC-CE and DCI-based joint TCI state switch, wherein the TCI state switch includes a two-part indication including both signals. In the two-part indication, a MAC CE may activate a subset or list of TCI states from an RRC-configured TCI pool, while the DCI indicates the target TCI state from list.

The considerations for defining the switching delay of the joint TCI state switch may include the following. A first consideration relates to the time duration to decode the TCI state switch command. The time duration for command decoding may be dependent on the type of switch indication, i.e., DCI-based or MAC-CE-based. For a DCI-based switch, the PDCCH/DCI parsing time is small relative to the other considerations discussed herein. Thus, for the DCI-based switch, the command decoding time may not be considered for the switching delay requirement. For a MAC-CE-based switch, the delay terms for the MAC-CE decoding time may be $T_{HARQ}+3$ ms, wherein $T_{HARQ}$ represents the timing between the DL data transmission (PDSCH) carrying the MAC-CE and the corresponding acknowledgement and 3 ms represents the MAC-CE parsing time.

A second consideration relates to the time duration for Rx beam refinement. This time duration is applicable only if the Rx beam of the target TCI state is unknown, according to the definition of known/unknown discussed above as defined in TS 38.133 8.10.1. The delay term for the Rx beam refinement may be $T_{L1\text{-}RSRP}$, as defined in TS 38.133 8.10.3, wherein $T_{L1\text{-}RSRP}$ represents the time for which the UE performs Rx beam sweeping to determine the best beam to receive the RS.

A third consideration relates to the time duration for time/frequency (T/F) offset tracking for the target TCI state. This time duration is applicable only if the UE needs additional time for fine time/frequency tracking of the DL signals of the target TCI state. For example, the UE configured with M active TCI states can track some number of the states simultaneously. If the UE is tracking all active TCI states, then it will not have to perform T/F tracking after the switch command. Otherwise, the UE needs some additional time to process the SSB of the target TCI state to determine TIE offsets. The term for T/F tracking may be $T_{first\text{-}SSB}+T_{SSB\text{-}proc}$, as defined in TS 38.133 8.10.3.

A fourth consideration relates to the time duration for pathloss measurement. When the TCI state is switched, the pathloss RS (PL-RS) for the UL channel might also change when the spatial relation information (QCL Type D) is changed. The additional time for pathloss measurement is needed only if the PL-RS (e.g., SSB or CSI-RS) is not maintained by the UE. The UE may maintain some number of PL-RS, e.g., up to 4 PL-RS. When a new PL-RS is activated, the UE measures the PL using L3-filtered RSRP. The term for PL measurement may be $5*T_{target\_PL\text{-}RS}+2$ ms, as defined in TS 38.133 8.14.3, wherein $T_{target\_PL\text{-}RS}$ represents the periodicity of the target PL-RS and the 2 ms represents the PL-RS processing time.

For the UE receiving the joint TCI state switch command, the starting point for the switching delay is the slot in which the UE receives the PDSCH (when the switch is indicated via MAC-CE) or the PDCCH (when the switch is indicated via DCI) indicating the joint TCI state switch. The ending point for the switching delay is the slot in which the UE transmits the UL signal associated with the target TCI state or receives the DL signal associated with the target TCI state, whichever is later.

As discussed above, the UE may need additional time for the UL transmission due to the PL-RS measurement and/or for the DL or UL grant. Thus, in view of the timing considerations discussed above, the switching delay for a. MAC CE-based joint TCI state switch may be $T_{HARQ}+3$ ms$+UK*T_{L1\text{-}RSRP}+TO*(T_{first\text{-}SSB}+T_{SSB\text{-}proc})+NM*(5*T_{target\_PL\text{-}RS}+2$ ms$)$, wherein UK=1 if the Rx beam is unknown, TO=1 if additional time for T/F offset tracking is needed (when the target TCI state is not tracked by the UE), and NM=1 if PL-RS is not maintained by UE. In an alternative embodiment, the L1-RSRP measurement for beam refinement and some of the PL-RS measurement may be on the same resources and performed in parallel, rather than sequentially. Thus, the switching delay may be THARQ+3 ms$+TO*($Tfirst-SSB+TSSB-proc$)+$max$(UK*TL1\text{-}RSRP, NM*(5*T_{target\_PL\text{-}RS} 2$ ms$))$.

The switching delay for a DCI-based joint TCI state switch may be [beam switch time]$+UK*T_{L1\text{-}RSRP}+TO*(T_{first\text{-}SSB}+T_{SSB\text{-}proc})+NM*(5*T_{target\_PL\text{-}RS}+2$ ms$)$, wherein the beam switch time may be defined by UE capability or indicated by the network. In an alternative embodiment, similar to above, the switching delay may be [beam switch time]+TO*(Tfirst-SSB+TSSB-proc)+max(UK*TL1-RSRP, NM*(5*TtargetPL-RS+2 ms)).

According to other exemplary embodiments, the TCI state switching delay time is determined for a separate TCI state switch including only UL signals. For a separate TCI state switch for UL-only target RS, the source RS can be a DL-RS (either an SSB or a CSI-RS, similar to above for the joint TCI state switch) or a UL sounding reference signal (SRS). The separate UL TCI state switch can be indicated by MAC CE and/or DCI. For example, similar to above, the TCI state switch may be a MAC-CE based separate UL TCI state switch, a DCI based separate UL TCI state switch, or a MAC-CE and DCI based separate UL TCI state switch, wherein the TCI state switch includes a two-part indication.

The considerations for defining the switching delay of the separate UL TCI state switch may include the following. These considerations may be similar in some ways to the considerations discussed above with respect to the joint TCI state switch, with various differences identified as indicated below.

The first consideration relates to the time duration to decode the TCI state switch command, similar to above for the joint TCI state switch. The time duration for command decoding may be dependent on the type of switch indication, i.e., DCI-based or MAC-CE-based. For a DCI-based switch, the PDCCH/DCI parsing time is small relative to the other considerations discussed herein. Thus, for the DCI-based switch, the command decoding time may not be considered for the switching delay requirement. For a MAC-CE-based switch, the delay terms for the MAC-CE decoding time may be $T_{HARQ}$+3 ms.

The second consideration relates to the time duration for Rx beam refinement. Similar to above, this time duration is applicable only if the Rx beam of the target TCI state is unknown, according to the definition of known/unknown discussed above as defined in TS 38.133 8.10.1. When the source RS of the target TCI state is a DL-RS, the delay term for the Rx beam refinement may be $T_{L1-RSRP}$, as defined in TS 38.133 8.10.3. However, when the source RS of the target TCI state is a UL-RS (SRS), the delay term for the Rx beam refinement is more difficult to quantify. Thus, in this scenario, different options are available. In one option, the UE may transmit using the target TCI state after Rx beam refinement. In another option, the UE may transmit with the best known beam without additional. Rx beam refinement.

In the separate UL TCI state switch scenario, there is no consideration with respect to T/F offset tracking.

A third consideration relates to the time duration for pathloss measurement. Similar to above, when the TCI state is switched, the pathloss RS (PL-RS) for the UL channel might also change when the spatial relation information (QCL Type D) is changed. The additional time for pathloss measurement is needed only if the PL-RS is not maintained by the UE. The term for PL measurement may be 5*$T_{target\_PL-RS}$ 2 ms, as defined in TS 38.133 8.14.3.

For the UE receiving the separate UL TCI state switch command, the starting point for the switching delay is the slot in which the UE receives the PDSCH with MAC-CE or the PDCCH with DCI indicating the separate UL TCI state switch. The ending point for the switching delay is the slot in which the UE transmits the UL signal associated with the target TCI state.

In view of the timing considerations discussed above, the switching delay for a MAC CE-based separate UL TCI state switch may be $T_{HARQ}$+3 ms+UK*$T_{L1-RSRP}$+NM* (5*$T_{target\_PL-RS}$+2 ms) r wherein UK=1 if the Rx beam is unknown, and NM=1 if PL-RS is not maintained by UE. In an alternative embodiment, similar to above, the L1-RSRP measurement for beam refinement and some of the PL-RS measurement may be on the same resources and performed in parallel, rather than sequentially. Thus, the switching delay may be $T_{HARQ}$+max(UK*TL1-RSRP, NM*(5*Ttarget_PL-RS+2 ms)).

The switching delay for a. DCI-based joint TCI state switch may be [beam switch time]+UK*$T_{L1-RSRP}$+NM* (5*$T_{target\_PL-RS}$+2 ms), wherein the beam switch time may be defined by UE capability or indicated by the network. In an alternative embodiment, similar to above, the switching delay may be [beam switch time]+max(UK*TL1-RSRP, NM*(5*Ttarget_PL-RS+2 ms)).

Figure 4:
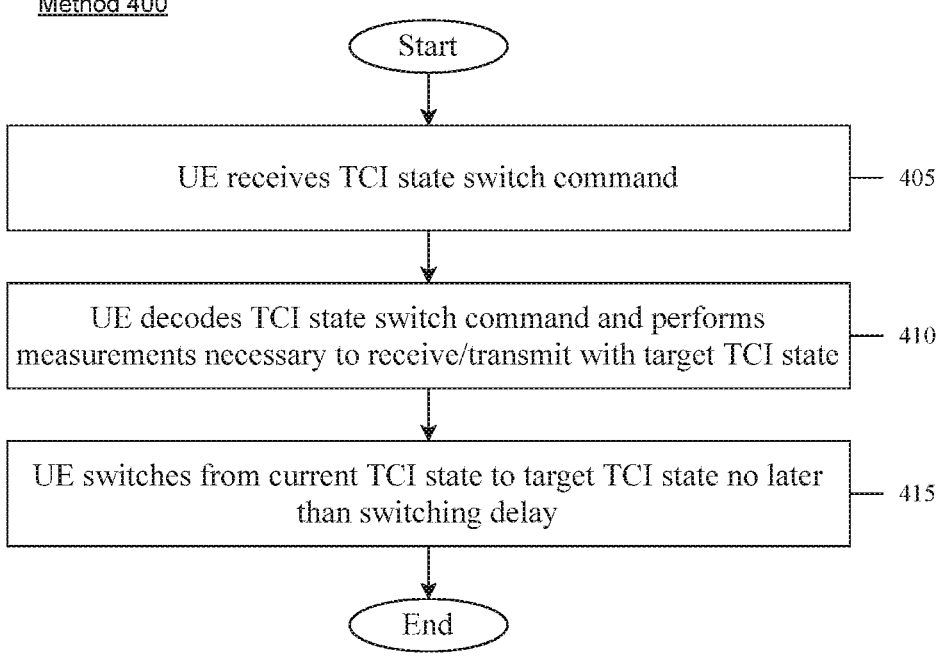
FIG. 4 shows an exemplary method for a TCI state switch in a unified TCI framework according to various exemplary embodiments described herein.

FIG. 4 shows an exemplary method 400 for a TCI state switch in a unified TCI framework according to various exemplary embodiments described herein.

In 405, the UE receives a TCI state switch command. The TCI state switch command may be for a joint TCI state switch or a separate UL TCI state switch and may be indicated via MAC-CE or DCI.

In 410, the UE decodes the TCI state switch command and performs the measurements necessary to receive/transmit with the target TCI state. For example, depending on the type of TCI state switch command (MAC-CE or DCI-based, joint TCI or separate UL ICI), the UE may need time to decode the TCI state switch command or perform T/F tracking. Additionally, the UE may need to perform Rx beam refinement or PL-RS measurements.

In 415, the UE switches from a current TCI state to the target TCI state no later than switching delay needed to decode the TCI state switch command and perform the necessary measurements. The UE may then transmit/receive using the target TCI state.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as 10S, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure.

Thus, it is intended that the present disclosure cover modifications and variations of this disclosure provided they come within the scope of the appended claims and their equivalent.

The invention claimed is:

1. A processor of a base station configured to perform operations, comprising:

generating, for transmission to a user equipment (UE), a beam switch time parameter;

configuring a joint TCI state command for a transmission configuration indicator (TCI) state change for a joint TCI state including uplink (UL) and downlink (DL) signals; and generating, for transmission to the UE, the joint TCI state command, wherein the command is transmitted via one of a medium access control (MAC) control element (CE) or a downlink control information (DCI), wherein the UE switches to receive DL signals and transmit UL signals with a target TCI state within a time duration for a switching delay, wherein when the command is transmitted via the DCI, the time duration is based on at least the beam switch time parameter, wherein the UE switches from a first pathloss reference signal (PL-RS) to a target PL-RS and the switching from the first PL-RS to the target PL-RS is completed at a same time as the switching to receive the DL signals and transmit the UL signals with the target TCI state.

2. The processor of claim 1, wherein, when the command is transmitted via the MAC CE, the time duration includes a MAC CE parsing time and an acknowledgement time for the command.

3. The processor of claim 1, wherein the time duration is further based on a time for receive (Rx) beam refinement when the Rx beam of the target TCI state is unknown.

4. The processor of claim 1, wherein the time duration is further based on a time for time and frequency offset tracking for DL signals of the target TCI state when the target TCI state is not tracked by the UE.

5. The processor of claim 1, wherein the time duration does not include a time for performing a pathloss (PL) measurement.

6. The processor of claim 1, wherein a source reference signal (RS) for the target TCI state is a synchronization signal block (SSB) or channel state information (CSI) RS.

7. A user equipment (UE), comprising:

a transceiver configured to communicate with a network; and a processor communicatively coupled to the transceiver and configured to perform operations comprising:

receiving a beam switch time parameter from the network;

receiving a command for a transmission configuration indicator (TCI) state change for a separate UL TCI state including uplink (UL) signals and not including downlink (DL) signals, wherein the command is transmitted via one of a medium access control (MAC) control element (CE) or a downlink control information (DCI);

decoding the separate UL TCI state command and performing measurements necessary to receive and transmit with a target TCI state, the measurements including a pathloss (PL) measurement for an UL channel;

switching to transmit the UL signals with the target TCI state within a time duration for a switching delay, wherein when the command is transmitted via the DCI, the time duration is based on at least the beam switch time parameter; and switching from a first PL reference signal (PL-RS) to a target PL-RS, wherein the switching from the first PL-RS to the target PL-RS is completed at a same time as the switching to transmit the UL signals with the target TCI state.

8. The UE of claim 7, wherein a source reference signal (RS) for the target TCI state is a synchronization signal block (SSB) or channel state information (CSI) RS.

9. A processor of a base station configured to perform operations comprising:

generating, for transmission to a user equipment (UE), a beam switch time parameter;

configuring a separate UL TCI state command for a transmission configuration indicator (TCI) state change for a separate uplink (UL) TCI state including UL signals and not including downlink (DL) signals; and generating, for transmission to the UE, the separate UL TCI state command, wherein the command is transmitted via one of a medium access control (MAC) control element (CE) or a downlink control information (DCI), wherein the UE switches to transmit the UL signals with the target TCI state within a time duration for a switching delay, wherein when the command is transmitted via the DCI, the time duration is based on at least the beam switch time parameter, wherein the UE switches from a first pathloss reference signal (PL-RS) to a target PL-RS and the switching from the first PL-RS to the target PL-RS is completed at the same time as the switching to transmit the UL signals with the target TCI state.

10. The processor of claim 9, wherein, when the command is transmitted via the MAC CE, the time duration includes a MAC CE parsing time and an acknowledgement time for the command.

11. The processor of claim 9, wherein the time duration is further based on a time for receive (Rx) beam refinement when the Rx beam of the target TCI state is unknown and a source reference signal (RS) for the target TCI state is a DL RS.

12. The processor of claim 9, wherein the time duration does not include a time for receive beam refinement when the Tx beam of the target TCI state is unknown and a source reference signal (RS) for the target TCI state is a UL RS, wherein the UE uses a best known beam without additional Tx beam refinement.

13. The processor of claim 9, wherein the time duration does not include a time for performing a pathloss (PL) measurement.

* * * * *